COLOR TELEVISION TRANSMITTER
Filed June 30, 1950
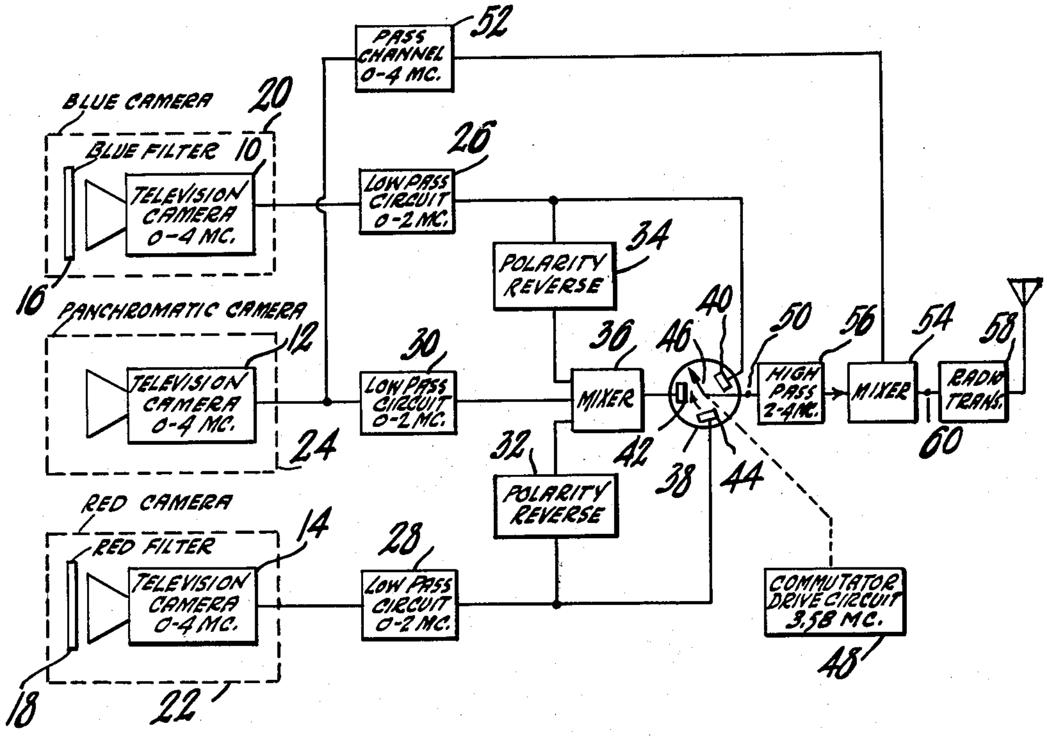
Inventor
RAY D. KELL
By [signature]
Attorney United States Patent Office 2,750,439

Patented June 12, 1956

2,750,439

COLOR TELEVISION TRANSMITTER

Ray D. Kell, Princeton, N. J., assignor to Radio Corporation of America, a corporation of Delaware Application June 30, 1950, Serial No. 171,407

4 Claims. (Cl. 178—5.4)

The present invention relates to color television systems, and, more particularly, although not necessarily exclusively, to color television systems of the dot multiplex variety.

More directly, the present invention is concerned with improved methods, techniques and apparatus for generating color signals which are "compatible" with existing black and white television receivers, as well as improvements in the quality of color images produced by color television receivers when receiving the novel signal of the present invention.

As is well known to those skilled in the television art, one of the most desirable characteristics for any color television system is "compatibility" with existing standard black and white or monochromatic television receivers. The desideratum is, of course, to provide a color television signal which when received by a standard black and white or monochromatic television receiver, results in a black and white picture having quality at least equal to images produced from standard black and white television signals.

A number of factors tend in color television systems to render the monochromatic version of the color signal of lower quality. For example, consider any time sharing multiplexing system for color television in which picture information corresponding to different color aspects of the scene are successively sent. Generally, the color information for each channel of the transmitter originates in a separate color camera which is responsive to substantially no color other than the particular primary color assigned to its channel. If now the color cameras are not perfectly registered with respect to each other on the scene being transmitted, the picture detail of the reproduced color television image will be impaired. Further although the cameras themselves may be physically in registration, any error in the scanning action of the color cameras will cause misregistration effects.

In systems where the color signal is intended for use only by color receivers this misregistration is of sufficient concern to warrant attention. However, in systems where a monochromatic version of the color signal is to be reproduced, as in a compatible television transmission system, the misregistration effects are even more pronounced. Thus, in the dot multiplex color television system described in the December 1949 issue of "Electronics" in an article entitled "New direction in color television," pages 66–71 inclusive, the otherwise compatible dot multiplex system may suffer greatly from misregistration problems.

A considerable advance toward the solution of misregistration problems in color television systems was provided by the arrangement disclosed by Alda V. Bedford in U. S. patent application, Ser. No. 153,473, filed April 1, 1950, now Patent No. 2,675,422, granted April 13, 1954, and entitled "Electrical Scanning." Bedford reduces color misregistration problems by deriving all high frequency picture detail information in the color signal from a single black and white camera tube. Further aid is given in the Bedford system by employing a subtractive process in obtaining color information for one color channel of the system. For example, in a three color television system the Bedford system discloses the use of a single black and white camera having substantial response to all component colors and only two color cameras, each responsive to a different one of the three primary colors. The low frequency components of the color cameras are then subtractively combined with the output of the black and white camera so that the resulting signal will represent the third primary color. When such information is applied to a time division multiplexing system Bedford then by-passes around the multiplexing circuit, the high frequency components of the black and white camera. As described in the above referenced Bedford specification, the resulting picture detail will then depend only upon the high frequency components of the black and white camera and therefore the resolution of both color pictures and compatible monochromatic pictures will be improved. The present invention, however, offers still further improvement by permitting both horizontal and vertical registration aspects to appear near perfect in a monochromatic version of the transmitted color signal.

Furthermore, the present invention offers an effective solution to bothersome color shift in the gray or shadow areas of a color picture. In prior art systems where a plurality of color cameras were used, each being responsive to a single different primary color, the contrast characteristics of all the cameras had to be nearly the same. If such was not possible, the color balance between the cameras and consequently balance in the picture would change with different brightness levels of the scene. Thus, a black and white grey scale transmitted over a color system would improperly evidence tinges of color at various points along the scale.

It is therefore an object of the present invention to provide an improved color television system which is productive of a television signal which is more perfectly compatible with existing black and white television receivers.

It is another object of the present invention to provide an improved color television system in which registration of color pick up cameras need not be so tedious to maintain high definition in the reproduced color television signal.

It is still further an object of the present invention to provide an improved television system in which the contrast or gamma characteristic of the several color pick up tubes employed need not be identical to such close tolerances as required by prior art systems.

The realization of the above objects and features of advantage of the present invention, as for example applied to a dot multiplex television system of the three color variety, contemplates the use of a black and white or panchromatic type camera. The output of this camera is continuously sent over the color transmission channel as an ordinary black and white signal. Superimposed, however, upon this signal is a secondary color indicating signal. This signal is of single carrier frequency having variable amplitude and variable phase. This color indicating signal is derived from the black and white camera taken in connection with two other single color cameras developing different primary color information. The low frequency components of the color cameras are subtractively combined with the low frequency components of the black and white signal to produce a third primary color signal. This results in three color signals having low frequency information only. These low frequency single color signals are then time division multiplexed in accordance with standard dot multiplex techniques described in the above article in Electronics. The present invention then extracts only the high frequency components from this resulting multiplex signal to obtain the above mentioned color indicating signal. Time division multiplexing involves sampling at the above-mentioned carrier frequency, and amplitude modulation of the carrier frequency by the three color signals generates sidebands of the carrier. The high frequency components herein mentioned are sidebands of the carrier frequency.

In order to more fully understand the novel operation and characteristics of the present invention as well as objects and features of advantage in addition to those set forth above, reference may be made to the following description which cooperates with the accompanying drawing:

The single figure of the drawing illustrates in block diagram one form of the present invention as applied to a time division dot multiplex type color television system.

Referring now to the figure, there is shown at 10, 12 and 14 typical black and white television cameras of any suitable type as for example shown and described by R. D. Kell and G. C. Sziklai in the RCA Review of March 1946, pages 67–76 inclusive, in an article entitled "Image Orthicon cameras." In front of the camera 10 is placed a blue filter 16 so that the signal developed at the output camera 10 represents substantially only the blue signal information aspect of the scene being transmitted. Correspondingly, a red filter 18 is placed in front of the camera 14 so that the output of this camera represents red signal information in the scene being transmitted. Accordingly, the combination of the blue filter 16 and the camera 10 may be regarded as a blue camera 20, while the red filter and camera combination may be regarded as a red camera 22. These cameras are indicated by the dotted line rectangles 20 and 22. It is to be understood that any appropriate type of television camera may be substituted for the arrangements shown. The camera 12 has no filter arrangement associated with it and hence its output signal will represent the signal variations corresponding to all colors. For convenience, this characteristic may be termed "panchromatic," meaning a response to a plurality of colors. The panchromatic camera is indicated by the dotted line rectangle 24.

The outputs of the cameras 20, 22 and 24 are respectively applied to the inputs of low pass filters 26, 28 and 30 which, solely by way of example, have been indicated as passing only those signal frequencies falling between 0 and 2 mc. The television cameras are themselves indicated as being productive of signal frequencies from 0 up to 4 mc. The lower frequency limit of 0 is, of course, hypothetical in a sense but is in practice simulated by the use of clamping circuits (not shown).

The output of the low pass circuits 28 and 26 are respectively applied to the polarity reversal circuits 32 and 34 so as to invert the phase of the signals appearing at the output of the low pass circuits. Polarity reversal may be obtained by any suitable means such as for example a single stage of resistance coupled amplification, as shown schematically at 110' in the "Reversing Switch Unit" of the U. S. patent to A. N. Goldsmith entitled "Color Television System," No. 2,423,769, issued July 8, 1947. The outputs of the two polarity reversal circuits 32 and 34 are applied along with the output of the low pass circuit 30 to the input of a mixer circuit 36. As described above and in the above referenced U. S. patent application, Ser. No. 153,473, this circuitry will permit the output of the blue camera 20 and the red camera 22 to be subtractively combined with the output of the panchromatic camera 24. Thus the signal of the output of the mixer 36 will represent green video information.

A commutator arrangement 38 is shown for successively sampling the blue, green and red signals which are applied at the sampling electrodes 40, 42 and 44 respectively. The armature 46 of the commutating device is represented as rotating from one contact to the other by means of a commutator drive circuit 48. The drive circuit may be any conventional oscillator or signal generating circuit and, by way of example only, has been indicated as having a frequency of 3.58 mc. A suitable commutating circuit for this purpose is shown and described in the U. S. patent of A. H. Dickinson entitled "Sequential Electronic Commutator with Supplementary Grid Control," No. 2,447,799 issued August 24, 1948. Other forms of commutators may, of course, be used. There will therefore appear at the output terminal 50 of the commutator 38 a time division multiplex color television signal which closely resembles the type shown and described in an article entitled "6 mc. compatible high definition color television system," appearing in the RCA Review for December 1949, and also discussed in the above referenced article appearing in the December 1949 issue of Electronics.

The circuitry of the figure thus far described is substantially identical with that shown in the above referenced U. S. patent application by A. V. Bedford, Ser. No. 153,473, now Patent No. 2,675,422.

According to the present invention the output of the panchromatic camera 24 is communicated by the 4 mc. pass channel 52 to one input of a mixer 54. In further accord with the present invention, the output of the commutator circuit appearing at terminal 50 is made to pass through a high pass circuit or filter 56 which communicates only the high frequency portions of the signal to the other input of the mixer 54. The output of the mixer 54 is, of course, fed to a conventional radio transmitter 58 for radio transmission. The wave form of the signal appearing at the output terminal 60 of the mixer 54 is substantially the same as a conventional time division dot multiplex color television signal, as pointed out above.

The mixer 54 may be of any conventional type which allows the linear combination of two electrical signals.

The operation of the present invention is substantially as follows: Since the only low frequency component fed to the mixer 54 is derived from the panchromatic camera 24, brightness variations in a picture reproduced by the transmitted signal will depend upon the output of this single camera.

The time division multiplex signal appearing at the commutator 38 constitutes in reality a 3.58 mc. carrier successively modulated in amplitude by samples from the blue, red and green channels. If the signal at terminal 50 could be looked at it would appear as a single frequency sine wave of 3.58 mc. which varies both in amplitude and in phase. The modulation will be by the 0–2 mc. signals at the sampling electrodes 40, 42 and 44 and will take the form of upper and lower sidebands of the 3.58 mc. carrier frequency. In this illustrative example, the upper sideband will be largely filtered away by filter 56 leaving the lower sideband which will pass through filter 56 and will contain the signal information from the low pass circuits 26 and 28 and mixer 36 respectively. The phase of the output signal at terminal 50 relative to the standard incorporated in the commutator drive 48 will represent the color of the image element being transmitted while the amplitude of the signal at terminal 50 will be indicative of the saturation of the particular color. This is, of course, evident from the nature of the time division multiplexing process shown and also from the discussion of the above referenced article appearing in the RCA Review of December 1949. Since the present invention derives all brightness components through the pass channel 52 and the 3.58 mc. carrier represents color and saturation the high pass filter 56 may serve as a link between the commutator 38 and the mixer 54.

To all intents and purposes the output of the mixer 54 appearing at the terminal 60 will represent a black and white television signal upon which is superimposed a 3.58 mc. sine wave whose phase and amplitude vary. Thus, when a conventional black and white receiver attempts to reproduce the color signal the 3.58 mc. component being a sine wave, will not produce brightness changes on the screen of the black and white receiver. This, of course, assumes that the kinescope is operating on a linear portion of the characteristic. Should for any reason, under these conditions, the cameras 20, 22 and 24 become grossly misregistered, no effect whatever on the definition of the image reproduced by a black and white (monochromatic) receiver will be noticed since all brightness variations come from the single panchromatic camera 24.

Likewise if the color signal is received and reproduced on a color television receiving set, misregistration of the cameras 20, 22 and 24 will have less effect than in prior art systems. This is so since misregistration of the cameras will only affect the phase of the 3.58 mc. of the sine wave appearing at the commutator 38. This will distort the color somewhat and will make the color information reproduced by the receiver somewhat misplaced. However, the majority of the definition in the picture originates again in the single panchromatic camera 24 and the resulting misregistered color information is of a low frequency order not in excess of 2 mc. Thus registration problems will be improved even in color television receiving systems.

It is noted that since the outputs of cameras 20 and 22 need not be greater than 2 mc. and sometimes as low as 100 kc. to provide acceptable color resolution the cameras 20 and 22 may be made very inexpensive. Since these color cameras may be simple and registration is by the very nature of the present invention no longer of such great concern, the entire structure of color camera comprising the aggregate of camera 20, 22 and 24 may be made quite cheaply and small in physical size. Although in the figure there have been indicated particular values of frequency for the various filter circuits and cameras, it is to be understood that the present invention is in no way limited thereby. Of course the pass channel 52 must allow passage of very low brightness variations plus black and white detail variations up to a frequency which is productive of acceptable picture definition.

Having thus described my invention, what I claim is:

1. In a color television system which develops a signal representative of the different component colors in a television scene, the combination of, a single scanning means for scanning said scene to develop a panchromatic signal train representing signal variations of substantially all component colors in the scene in full bandwidth, a plurality of other scanning means for scanning said scene, each of said other scanning means developing a color signal train substantially representing intensity variations of a different single component color in the scene, combining means connected with all of said scanning means for subtractively combining the low frequency components of said panchromatic signal train with the low frequency components of each of the color signal trains developed by said other scanning means to produce a resultant signal train, sampling means coupled to said plurality of color signal train developing scanning means and to said combining means for consecutively and cyclically sampling said color signal trains and said resultant signal train at a frequency higher than said low frequency components to produce a color indicating signal having high frequency components, filter means for selecting the high frequency components of said color indicating signal to produce a color detail signal, and means for mixing the signal developed by said panchromatic scanning means with said color detail signal to produce a composite color signal.

2. In a color television system which develops a signal representative of the different component colors in a television scene, the combination of, a single scanning means for scanning said scene to develop a panchromatic signal train of full bandwidth representing signal variations of substantially all component colors in the scene, a plurality of other scanning means for scanning said scene, each of said other scanning means developing a color signal train substantially representing intensity variations of a different single component color in the scene, combining means connected with all of said scanning means for subtractively combining the low frequency components of said panchromatic signal train with the low frequency components of each of the color signal trains developed by said other scanning means to produce a resultant signal train, a source of signal carrier having a frequency higher than said low frequency components, modulating means for successively modulating said carrier with amplitude variations of said color signal trains and said resultant signal train to produce a color indicating signal having high frequency components, high pass-filter means for selecting the high frequency components of said color indicating signal to produce a color detail signal, and means for mixing the signal developed by said panchromatic scanning means with said color detail signal to produce a composite color signal.

3. In a color television system, a combination of, a single panchromatic scanning means for scanning a television scene to develop a panchromatic signal train of full bandwidth representing intensity variations of substantially all useful component colors in the scene, said panchromatic signal train being divisible into high and low frequency components, a plurality of other scanning means, each developing a color signal train substantially representing intensity variations of a different single component color in the scene, each color signal train being divisible to low and high frequency components, combining means connected with said scanning means for subtractively combining the low frequency component of said panchromatic signal train with the low frequency components of said color signal trains to produce a resultant signal train, sampling means operating at a frequency higher than said low frequency components for consecutively and cyclically sampling said resultant signal train and the low frequency components of said color signal trains to produce a color indicating signal having high frequency components, and means for mixing the high frequency components of said color indicating signal with both the low and high frequency components of said panchromatic signal train.

4. Apparatus for generating signals for use in color television comprising in combination, means for deriving a full band video signal representing the apparent brightness as a scene is scanned, means for deriving video signals representing the intensity variations of a first component color as the scene is scanned, means for deriving video signals representing the intensity variations of a second component color as the scene is scanned, means for subtracting the low frequency portions of the video signals representing the first and second component colors from the low frequency portion of the video signal representing brightness so as to derive a video signal representing a third component color, means for modulating a carrier wave having a frequency higher than the highest frequency of said low frequency video signal portions with all said color video signals so as to change the phase and amplitude of the carrier wave in accordance with the relative amplitudes of the low frequency portions of all said color video signals, and means for adding at least a portion of the frequencies of these signals produced by the modulation process with the full band brightness signal.

References Cited in the file of this patent

UNITED STATES PATENTS

| | | |
|---|---|---|
| 2,492,926 | Valensi | Dec. 27, 1949 |
| 2,627,549 | Kell | Feb. 3, 1953 |

OTHER REFERENCES

RCA Review, December 1949, pp. 504–509.